US009171430B2

(12) United States Patent
Boon et al.

(10) Patent No.: US 9,171,430 B2
(45) Date of Patent: Oct. 27, 2015

(54) MEDIA ITEM TRANSPORTER

(71) Applicant: NCR CORPORATION, Duluth, GA (US)

(72) Inventors: Anthony Boon, Kitchener (CA); Frank B. Dunn, Waterloo (CA)

(73) Assignee: NCR Corporation, Duluth, GA (US)

( * ) Notice: Subject to any disclaimer, the term of this patent is extended or adjusted under 35 U.S.C. 154(b) by 70 days.

(21) Appl. No.: 13/960,351

(22) Filed: Aug. 6, 2013

(65) Prior Publication Data

US 2015/0041283 A1 Feb. 12, 2015

(51) Int. Cl.

*B65G 15/12* (2006.01)
*G07F 19/00* (2006.01)
*G07D 11/00* (2006.01)

(52) U.S. Cl.

CPC .......... *G07F 19/202* (2013.01); *G07D 11/0003* (2013.01); *G07D 11/0036* (2013.01)

(58) Field of Classification Search

CPC ........... B65H 2220/01; B65H 2220/02; B65H 2220/03; B65H 2511/13; B65H 2801/06; B65H 2511/22

USPC ................ 198/604, 620, 626.3, 626.4, 626.5, 198/626.6, 817; 414/790.6, 794.4; 271/4.02, 6, 273

See application file for complete search history.

(56) References Cited

U.S. PATENT DOCUMENTS

| | | | | |
|---|---|---|---|---|
| 4,135,620 | A * | 1/1979 | Harcuba et al. | 198/626.5 |
| 4,558,373 | A * | 12/1985 | Plasencia et al. | 271/273 |
| 4,856,643 | A * | 8/1989 | Lachonius et al. | 198/626.5 |
| 5,277,295 | A * | 1/1994 | Grecksch et al. | 198/457.01 |
| 5,435,542 | A * | 7/1995 | Van Pham et al. | 271/273 |
| 5,628,605 | A * | 5/1997 | Miyoshi | 414/331.01 |
| 7,959,150 | B2 * | 6/2011 | Krucinski et al. | 271/273 |
| 2009/0115127 | A1 * | 5/2009 | Konig et al. | 271/273 |
| 2010/0191368 | A1 * | 7/2010 | Celeste et al. | 198/617 |

* cited by examiner

*Primary Examiner* — James R Bidwell
(74) *Attorney, Agent, or Firm* — Paul W. Martin

(57) ABSTRACT

A media item transporter which accommodates media items and bunches media items of various thicknesses. The media item transporter includes a first transport member and a further transport member located opposite the first transport member to transport a bunch of media items located between the transport members along a transport path, a drive mechanism to move a one of the first and further transport members towards or away from a remainder one of the first and further transport members to selectively locate the first and further transport members in a selectable spaced apart relationship, and at least one sensor to determine a position of the one transport member with respect to the remainder one transport member.

15 Claims, 9 Drawing Sheets

MEDIA ITEM TRANSPORTER

FIELD OF THE INVENTION

The present invention relates to a method and apparatus for transporting media items along a transport path. In particular, but not exclusively, the present invention relates to locating a bunch of media items between a pair of transport members of a media item processing module for transporting the bunch of media items along a transport path within the media item processing module.

Various situations are known in which media items are transported along a transport pathway in a Self-Service Terminal (SST). For example, in a typical check depositing Automated Teller Machine (ATM), an ATM customer is allowed to deposit a check (without having to place the check in a deposit envelope) in a publicly accessible, unattended environment. To deposit a check, the ATM customer inserts an identification card through a card slot of the ATM, enters the amount of the check being deposited and inserts a check to be deposited through a check slot of a check acceptor. An infeed check transport mechanism receives the inserted check and transports the check in a forward direction along an "infeed" check transport path to a number of locations within the ATM to process the check. Other forms of media item may include currency notes, coupons, vouchers, tokens, or the like, and the media items may include one media item or a number of media items in the form of a bunch of media items.

It is known for an infeed check transport mechanism to include a first transport member and an opposed second transport member facing the first transport member for transporting a bunch of media items located between the first and second transport members along a transport path. It is also known for each of the transport members to include at least one transport belt to effectively grip and move the bunch of media items along the transport path. The first transport member is movable towards or away from the second transport member to allow a bunch of media items to be located between the first and second transport members and transported along a transport path.

The number of media items in a bunch of media items is variable so the thickness of one bunch may be different to the thickness of another bunch. Alternatively, only a single media item may be located between the first and second transport members for transporting along the transport path.

However, known infeed transport mechanisms typically move from a closed configuration to an open configuration and have no or limited control when moving the first transport member between the open and closed configurations. In turn, it is known for checks or currency notes to curl up when located between the first and second transport members particularly when the spacing between the transport members is greater than a thickness of the bunch itself. This can result in media jams, damage to media items and undesirable downtime of the SST.

Known infeed transport mechanisms are also relatively bulky and are becoming less suitable for the ever decreasing space envelope available within a media item processing module as the demand for more compact media item processing modules is ever increasing. Known mechanisms are also relatively complex, including many components, which in turn increases the requirement for maintenance and replacement of worn or broken components. This in turn results in undesirable downtime of the SST which includes the media item processing module.

SUMMARY OF THE INVENTION

It is an aim of the present invention to at least partly mitigate the above-mentioned problems.

It is an aim of certain embodiments of the present invention to provide a method and apparatus for receiving different bunches of media items having different thicknesses and transporting the bunch along a predetermined transport path.

It is an aim of certain embodiments of the present invention to provide a method and apparatus for pinching a bunch of media items to effectively transport the bunch along a predetermined transport path whilst preventing the bunch curling or shifting or being damaged during transportation.

It is an aim of certain embodiments of the present invention to provide a compact and simple mechanism for selectively moving a first transport member with respect to a second transport member of a media item transport mechanism in a controlled manner.

It is an aim of certain embodiments of the present invention to provide a media item transport mechanism which can determine a position of a first transport member with respect to a second transport member for determining a thickness of a bunch of media items.

It is an aim of certain embodiments of the present invention to provide apparatus for receiving a bunch of media items having a total thickness of around 20 mm and transporting the bunch along a predetermined transport path.

It is an aim of certain embodiments of the present invention to provide a method and apparatus which allows a first transport member to remain in an open or closed configuration with respect to a second transport member without having to apply a drive force to the first transport member to keep it in the open or closed configuration.

According to a first aspect of the present invention there is provided apparatus for transporting a bunch of media items, comprising:

- a first transport member and a further transport member located opposite the first transport member to transport a bunch of media items located between said transport members along a transport path;
- a drive mechanism to move a one of the first and further transport members towards or away from a remainder one of the first and further transport members to selectively locate the first and further transport members in a selectable spaced apart relationship; and
- at least one sensor to determine a position of the one transport member with respect to the remainder one transport member.

Aptly, the drive mechanism comprises:

- at least two linkage arms, each arm having a respective first and further end pivotably connected to a respective transport member or a housing for said respective transport member; and
- at least one drive shaft coupled to an end of at least one linkage arm to selectively move the one transport member with respect to the remainder one transport member.

Aptly, the drive mechanism further comprises:

- a stepper motor that drives a cam member to selectively rotate the cam member about a cam axis to a desired rotatory position; and
- a lever arm that drives the at least one drive shaft and that selectively moves responsive to rotation of the cam member.

Aptly, said cam member comprises:

- a running surface having two end positions corresponding to a space between the first and further transport members being a minimum and maximum respectively; wherein
- in each of the two end positions, a lever force applied on the cam member by said lever arm is directed towards the cam axis.

Aptly, the cam member is urged against a biasing member that moves with the lever arm.

Aptly, the biasing member comprises:

a bearing that is spring loaded via a spring that deflects when the first and further transport members are a predetermined distance apart.

Aptly, said at least one sensor comprises:

at least one accelerometer on a respective one of the linkage arms to determine a vertical position of the one transport member with respect to the remainder one transport member.

Aptly, said at least one sensor comprises:

an optical sensor that determines a location of a flag member carried on the cam member to indicate when the one transport member is in a predetermined position with respect to the remainder one transport member.

Aptly, said at least two linkage arms remain in a common orientation as said drive shaft rotates.

According to a second aspect of the present invention there is provided a media item processing module comprising apparatus according to the first aspect of the present invention.

According to a third aspect of the present invention there is provided a Self-Service Terminal (SST) comprising a media item processing module according to the second aspect of the present invention.

According to a fourth aspect of the present invention there is provided a method of transporting a bunch of media items, comprising the steps of:

locating a bunch of media items between first and further spaced apart transport members;

adjusting a space between the first and further transport members response to a thickness of said bunch of media items by moving a one of the transport members towards or away from a remainder one of the transport members;

determining a position of the one transport member with respect to the remainder one transport member; and transporting the bunch of media items along a transport path.

Aptly, the method further comprises the steps of:

via a stepper motor, driving a cam member comprising a running surface having two end positions; and pivoting linkage arms that support a one of the first and further transport members with respect to a respective housing via a lever arm that moves responsive to rotation of the cam member.

Aptly, the method further comprises the steps of:

determining a vertical position of the one transport member with respect to the remainder one transport member.

Aptly, the method further comprises the steps of:

indicating when the one transport member is in a predetermined position with respect to the remainder one transport member by determining a location of a flag member on the cam member.

According to a fifth aspect of the present invention there is provided a method of providing a desired separation between spaced apart transport members for transporting a bunch of media items, comprising the steps of:

translating a one of a first transport member and a further transport member with respect to a remainder one of the first and further transport members responsive to a thickness of a bunch of media items located between the first and further transport members.

According to a sixth aspect of the present invention there is provided apparatus for transporting a bunch of media items, comprising:

an upper item guide comprising a substantially planar upper guide surface; and a lower item guide comprising a substantially planar lower guide surface parallel with the upper guide surface; wherein a one of the upper and lower item guides is translatable with respect to a remainder one of the upper and lower item guides in a direction non-perpendicular to the guide surfaces to locate the upper and lower item guide surfaces in a selectable spaced apart relationship.

According to a seventh aspect of the present invention there is provided a method of transporting a bunch of media items, comprising the steps of:

adjusting a space between an upper and lower item guide by translating a one of the item guides with respect to a remainder one of the item guides in a direction non-perpendicular to respective planar guide surfaces of the item guides;

locating a bunch of media items between the item guides; and transporting the bunch of media items by rotating drive members of the upper and lower item guides.

According to an eighth aspect of the present invention there is provided a method of providing a desired separation between parallel guide surfaces used to transport a bunch of media items, comprising the steps of:

translating a one of an upper guide surface and a lower guide surface with respect to a remainder one of the upper and lower guide surfaces in a direction that is non-perpendicular to the guide surfaces, said upper guide surface being parallel with said lower guide surface.

Certain embodiments of the present invention may allow different bunches of media items each bunch having a different thickness to be received by a media item transport mechanism and transported along a predetermined transport path for processing in a media item processing module.

Certain embodiments of the present invention may provide a compact and simple mechanism for moving a first transport member of a media item transport mechanism with respect to a second transport member of the media item transport mechanism to receive differently sized bunches of media items and pinch the bunch to effectively transport the bunch along a transport path without the bunch curling, shifting or being damaged.

Certain embodiments of the present invention may provide apparatus for receiving a bunch of media items having a total thickness of around 20 mm and transporting the bunch along a predetermined transport path.

Certain embodiments of the present invention may provide apparatus for determining a position of a first transport member with respect to a second transport member for measuring a thickness of a bunch of media items located between the transport members.

Certain embodiments of the present invention may provide a method and apparatus which allows a first transport member to remain in an open or closed configuration with respect to a second transport member without applying a drive force to the first transport member.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
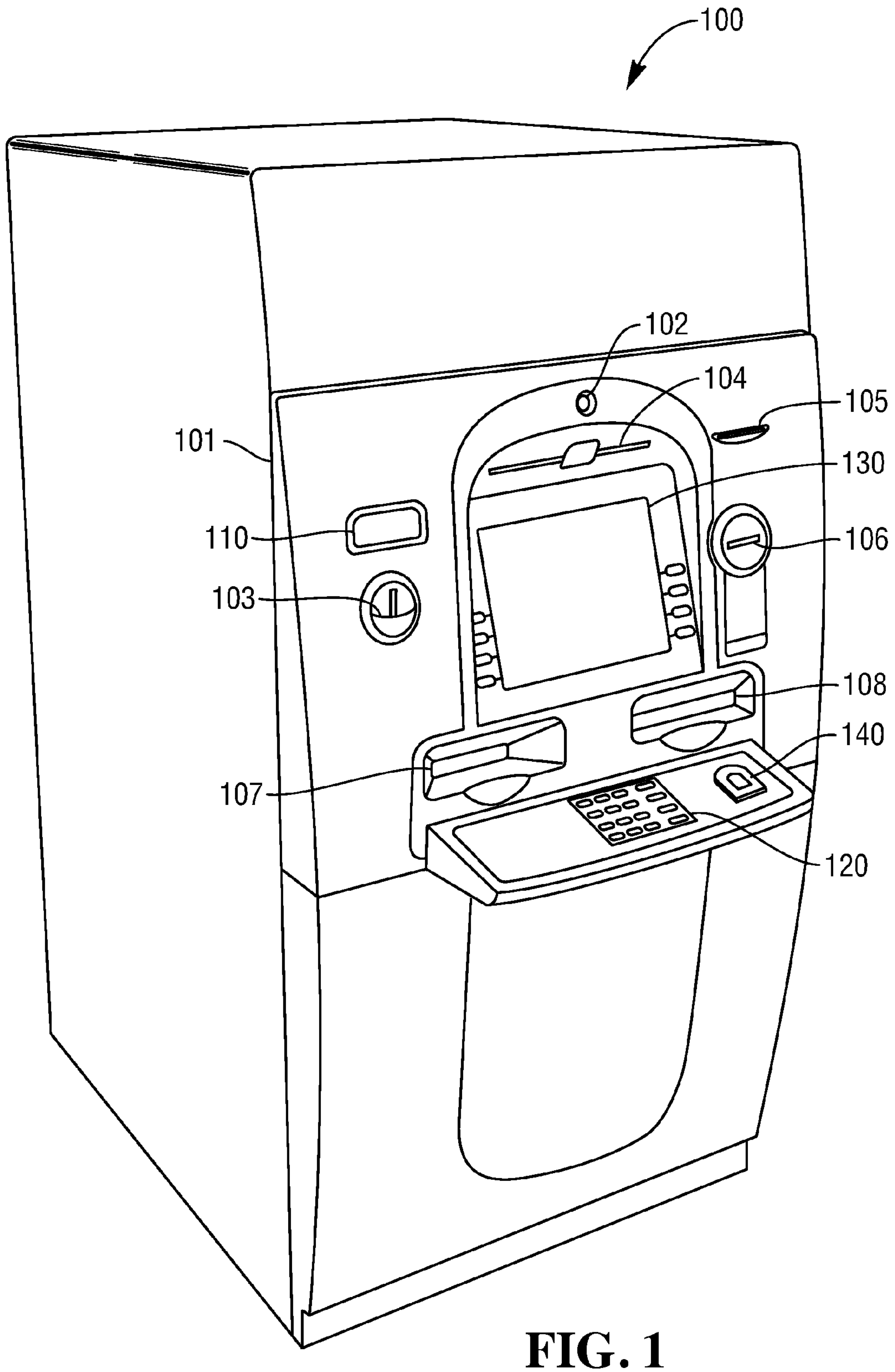
FIG. 1 illustrates an ATM according to an embodiment of the present invention.

In the drawings like reference numerals refer to like parts.

FIG. 1 illustrates a self-service check depositing terminal in the form of an image-based check depositing Automated Teller Machine (ATM) 100. It will be appreciated that certain embodiments of the present invention are applicable to a wide variety of terminals in which items of media such as checks and/or currency notes and/or giros and/or lottery tickets and/or other such flexible sheet-like items of media are to be transported and directed in different directions. The type of terminal will of course be appropriate for the type of items of media being transported.

As illustrated in FIG. 1, the ATM 100 includes a fascia 101 coupled to a chassis (not shown). The fascia 101 defines an aperture 102 through which a camera (not shown) images a customer of the ATM 100. The fascia 101 also defines a number of slots for receiving and dispensing media items and a tray 103 into which coins can be dispensed. The slots include a statement output slot 104, a receipt slot 105, a card reader slot 106, a cash slot 107, a further cash slot 108 and a check input/output slot 110. The slots and tray are arranged such that the slots and tray align with corresponding ATM modules mounted within the chassis of the ATM.

The fascia 101 provides a customer interface for allowing an ATM customer to execute a transaction. The fascia 101 includes an encrypting keyboard 120 for allowing an ATM customer to enter transaction details. A display 130 is provided for presenting screens to an ATM customer. A fingerprint reader 140 is provided for reading a fingerprint of an ATM customer to identify the ATM customer.

Within the chassis of the ATM it will be understood that items of media must be transported from time to time from one location to another. The pathway taken by any particular item of media is dependent upon an operation being carried out at the ATM and may also be dependent upon other factors such as whether a customer of the ATM is authorized and/or whether an item of media being transported satisfies certain pre-determined criteria.

Figure 2:
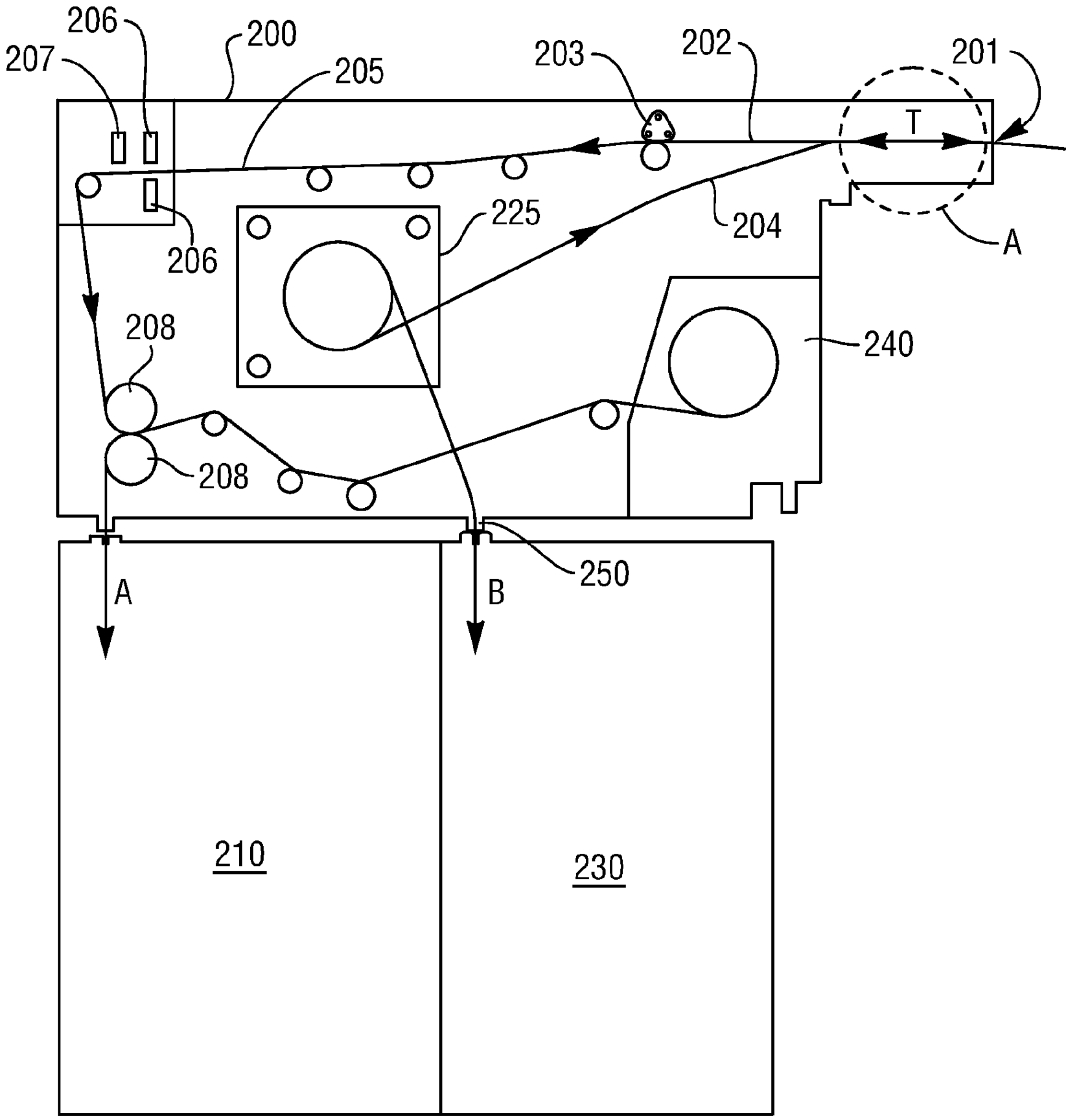
FIG. 2 illustrates transport pathways and modules within the ATM of FIG. 1 according to an embodiment of the present invention.

FIG. 2 illustrates possible transport pathways and internal modules within the ATM which can be utilized to process deposited checks. A check processing module 200 has an access mouth 201 through which incoming checks and/or currency notes are deposited or outgoing checks are dispensed. This mouth 201 is aligned with an infeed aperture in the ATM which thus provides an input/output slot 110. A bunch of one or more media items, such as currency notes or checks, is input or output. Aptly, a bunch of up to a hundred, or more, items can be received/dispensed. Incoming checks follow a first transport path 202 away from the mouth 201 in a substantially horizontal direction from right to left shown in FIG. 2. The first transport path 202 is also referred to as the infeed path. The checks then pass through a feeder/separator 203 and along another pathway portion 205 which is also substantially horizontal and right to left. The checks are then de-skewed and read by imaging cameras 206 and an MICR reader 207. Checks are then directed substantially vertically downwards to a point between two nip rollers 208. These nip rollers co-operate and are rotated in opposite directions with respect to each other to either draw deposited checks inwards (and urge those checks towards the right hand side in FIG. 2), or during another mode of operation, the rollers can be rotated in an opposite fashion to direct processed checks downwards in the direction shown by arrow A in FIG. 2 into a check bin 210. Incoming checks which are moved by the nip rollers 208 towards the right can either be diverted upwards (in FIG. 2) into a re-buncher unit 225, or downwards in the direction of arrow B in FIG. 2 into a cash bin 230, or to the right hand side shown in FIG. 2 into an escrow 240. Checks from the escrow can be directed to the re-buncher 225 or downwards into the cash bin 230. Checks can be reprocessed or returned to a customer via a further transport path 204, also known as the return path.

Figure 3:
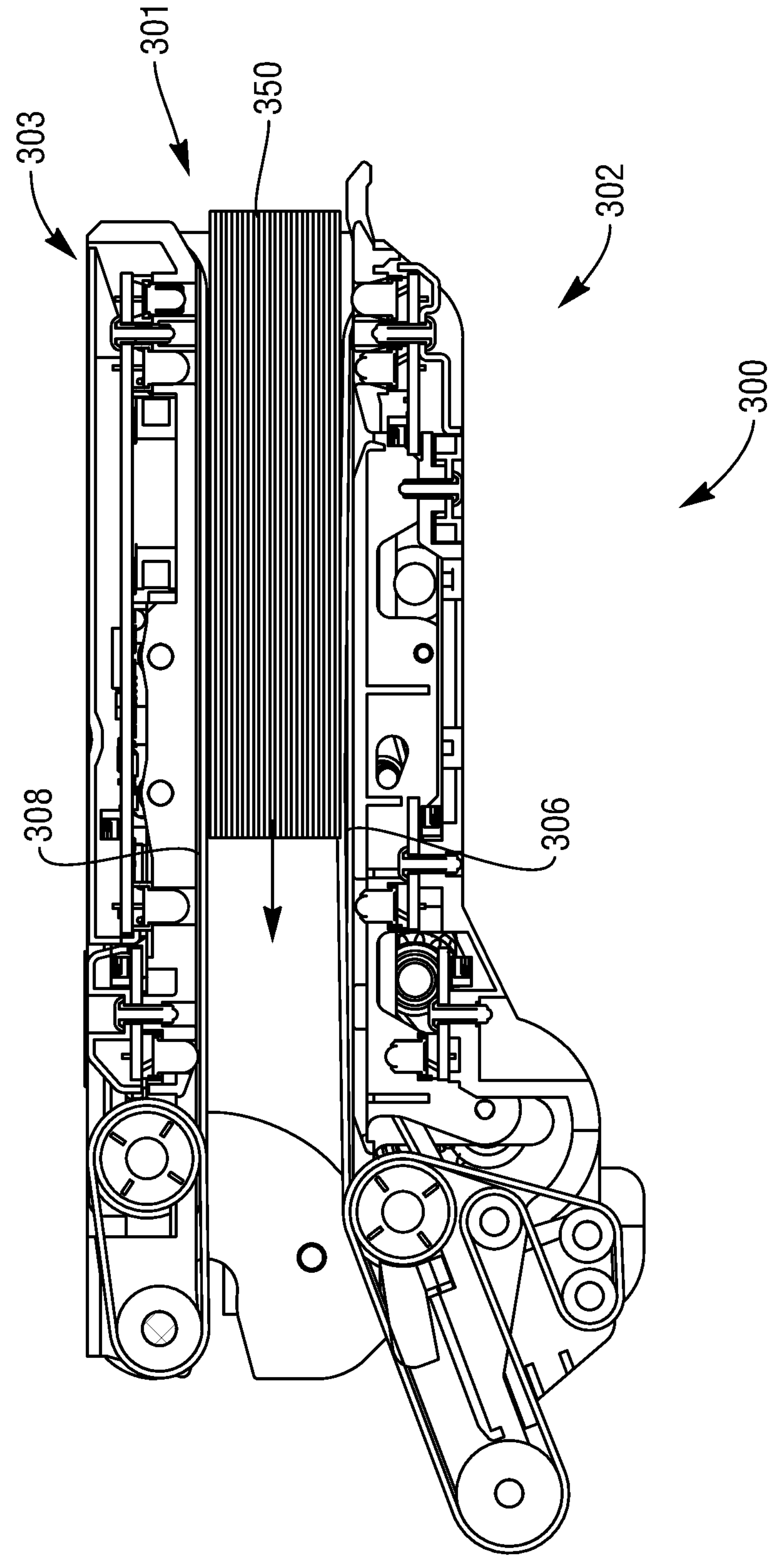
FIG. 3 illustrates a media item transport mechanism according to an embodiment of the present invention wherein the transport mechanism is in an infeed and fully open configuration for transporting a bunch of media items along an infeed transport path.

As illustrated in FIG. 3, a media item transport mechanism 300 includes a pair of opposed transport members 302, 303. The pair of transport members 302, 303 provide a predetermined transport path T for a bunch of media items 350, such as checks or currency notes, to be urged along by the transport mechanism 300. The transport mechanism 300 is located within the media item processing module 200 at region A as shown in FIG. 2 such that an infeed end region 301 of the pair of transport members 302, 303 is located and aligned with the access mouth 201 of the check processing module 200 for receiving/dispensing media items 350 from/to a customer at the ATM 100.

Each of the transport members 302, 303 includes a respective pair of spaced apart transport belts 306, 308 for urging one or more media items along the transport path T. Alternatively or additionally, rollers, gears, wheels, plates, or the like, may be used to urge one or more media items along the transport path T.

Figure 4:
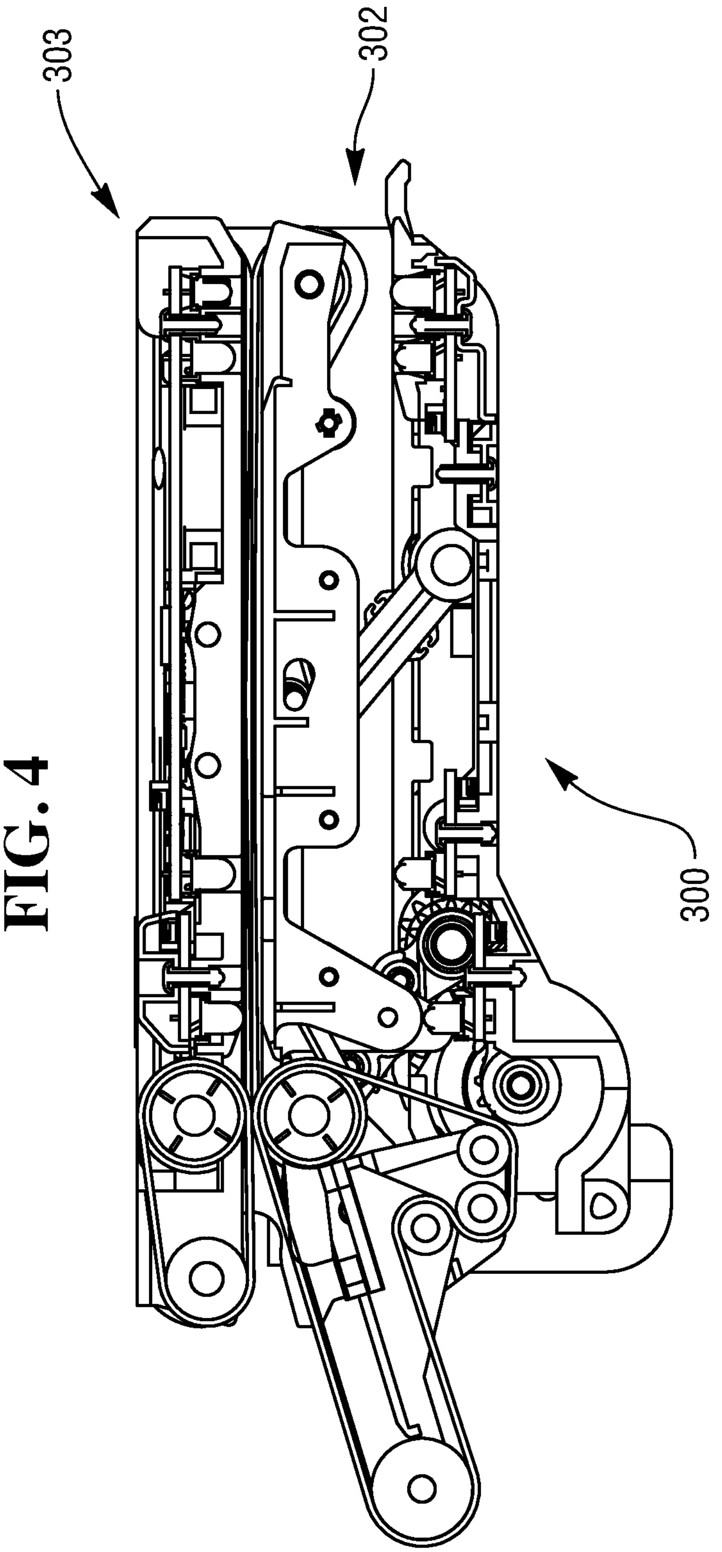
FIG. 4 illustrates the media item transport mechanism of FIG. 3 in a fully closed configuration.

As best shown in FIG. 4, the lower transport member 302 is selectively moved towards or away from the upper transport member 303 between closed and open configurations. A distance between the transport members 302, 303 when in the open configuration (as shown in FIG. 3) is determined by the thickness of a bunch of media items to be or being transported through the transport mechanism 300 and along the transport path T. For example, the movable lower transport member 302 and the fixed upper transport member 303, and the respective transport belts 306, 308, will be closer together when gripping and transporting a single media item (as shown in FIG. 4) or a relatively thin bunch of media items and spaced further apart from each other when transporting a relatively thick bunch of media items 350 (as shown in FIG. 3). A gap between the lower transport member 302 and the upper transport member 303 is selectively varied depending on the thickness of a bunch of media items 350 to be received by the transport mechanism 300 and transported along the transport path T. The media item transport mechanism 300 according to certain embodiments of the present invention can receive and transport a bunch of media items of up to around 20 mm in thickness between the upper and lower transport members 302, 303.

Figure 5:
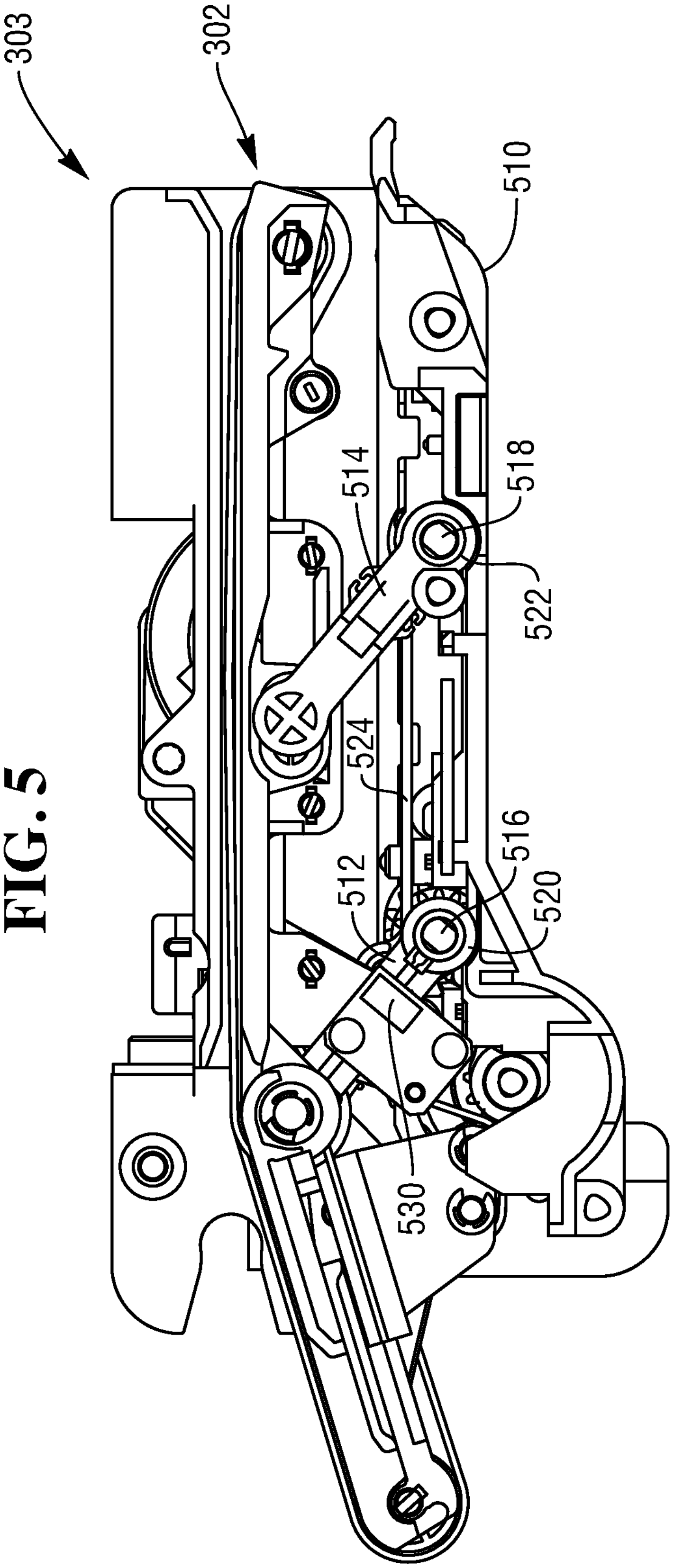
FIG. 5 illustrates a cross-section through the media item transport mechanism of FIGS. 3 and 4.

As shown in FIG. 5, the lower transport member 302 is coupled to a base portion 510 of the transport mechanism 300 by two pairs of linkage arms 512, 514. Each pair of arms 512, 514 is fixedly connected to a respective linkage shaft 516, 518 such that each arm 512, 514 cannot rotate relative to its respective shaft 516, 518. Respective pulleys 520, 522 mounted to at least one end of each shaft 516, 518 are coupled together a belt 524 so that all four arms of the two pairs of arms 512, 514 remain in the same orientation as the lower transport member 302 moves towards or away from the upper transport member 303 between open and closed configurations. A torsion spring (not shown) is mounted to each linkage shaft 516, 518 to urge the lower transport member 302 towards the upper transport member 303 and to apply a pinch force on a bunch of media items located in the transport mechanism 300. The spring force applied by the torsion springs controls the pinch force applied to a bunch irrespective of a bunch thickness.

Figure 6:
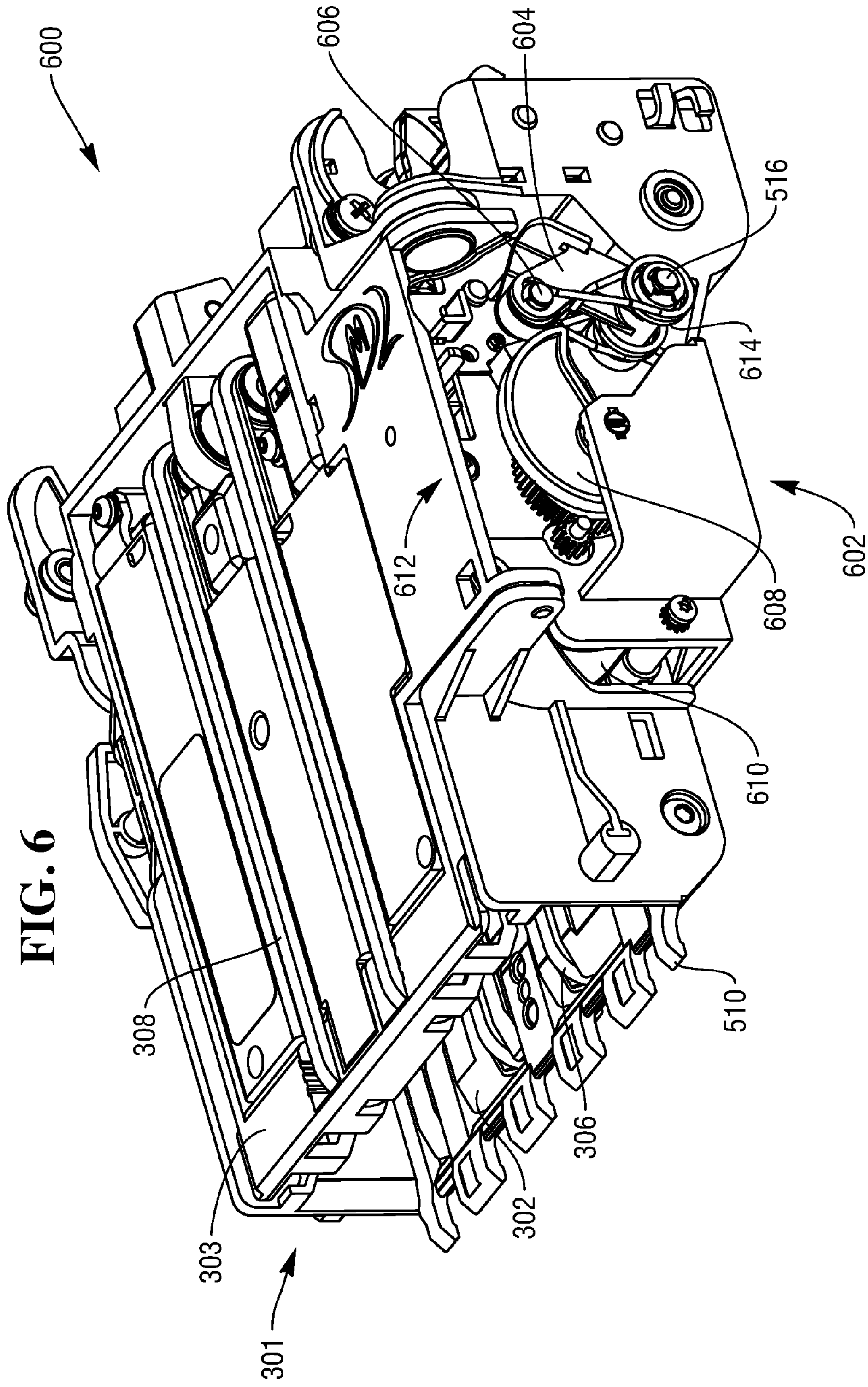
FIG. 6 illustrates an infeed portion of the transport mechanism of FIGS. 3 to 5 when in the open configuration and an actuator mechanism for moving the lower transport member with respect to the upper transport member of the transport mechanism.
Figure 9:
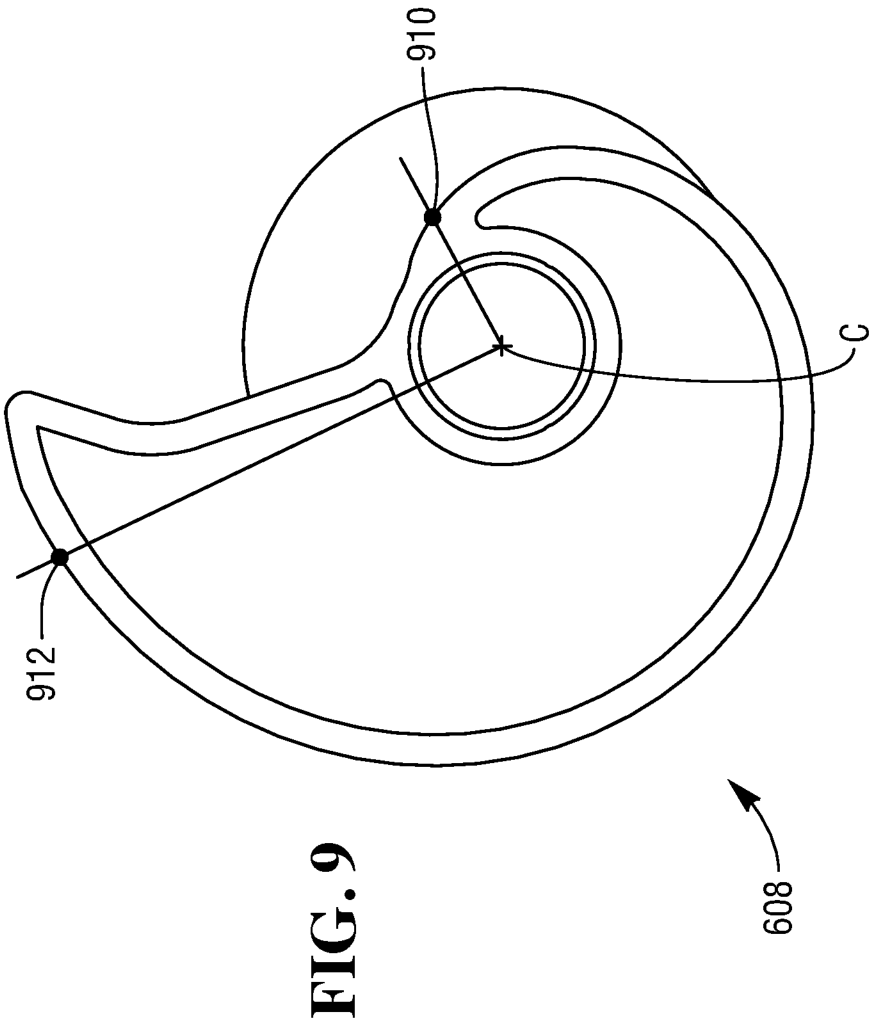
FIG. 9 illustrates the cam member of the actuator mechanism.

As shown in FIG. 6, an infeed portion 600 of the transport mechanism 300 includes a drive mechanism 602 for moving the lower transport member 302 away from the upper transport member 303. The drive mechanism 602 overcomes the force being applied by the torsion springs to move the lower transport member 302 downwardly towards the base portion 510 and can hold the lower transport member 302 in a desired position between the upper transport member 303 and the base portion 510. One of the linkage shafts 516 extends outwardly from the infeed portion 600, in a direction which is perpendicular to the transport path along which media items are transported, and a lever arm 604 is mounted to one of its ends. A bearing member 606 is pivotally attached to a free end of the lever arm 604. A rotatable cam member 608 engages with the bearing member 606 such that when the cam member 608 is rotated about a cam axis C (as shown in FIG. 9), the lever arm 604 is moved generally towards or away from the cam axis C between spaced apart end positions 910, 912 of the cam member 608. The cam member 608 is coupled to a stepper motor 610 via a set of transfer gears 612 such that the stepper motor 610 selectively rotates the cam member 608 about the cam axis C. One position 912 of the end positions 910, 912 of the cam member 608 corresponds to a fully open configuration of the media item transport mechanism 300 wherein the lower transport member 302 is fully spaced apart from the upper transport member 303. The other position 910 of the two end positions 910, 912 of the cam member 608 corresponds to a fully closed configuration of the media item transport member 300 wherein the lower transport member 302 contacts the upper transport member 303. The stepper motor and cam member arrangement provides accurate and incremental control when moving the lower transport member 302 with respect to the upper transport member 303. Also, locating the drive mechanism 602 to the side of the transport members 302, 303 provides a compact transport mechanism 300 having few components.

Figure 7:
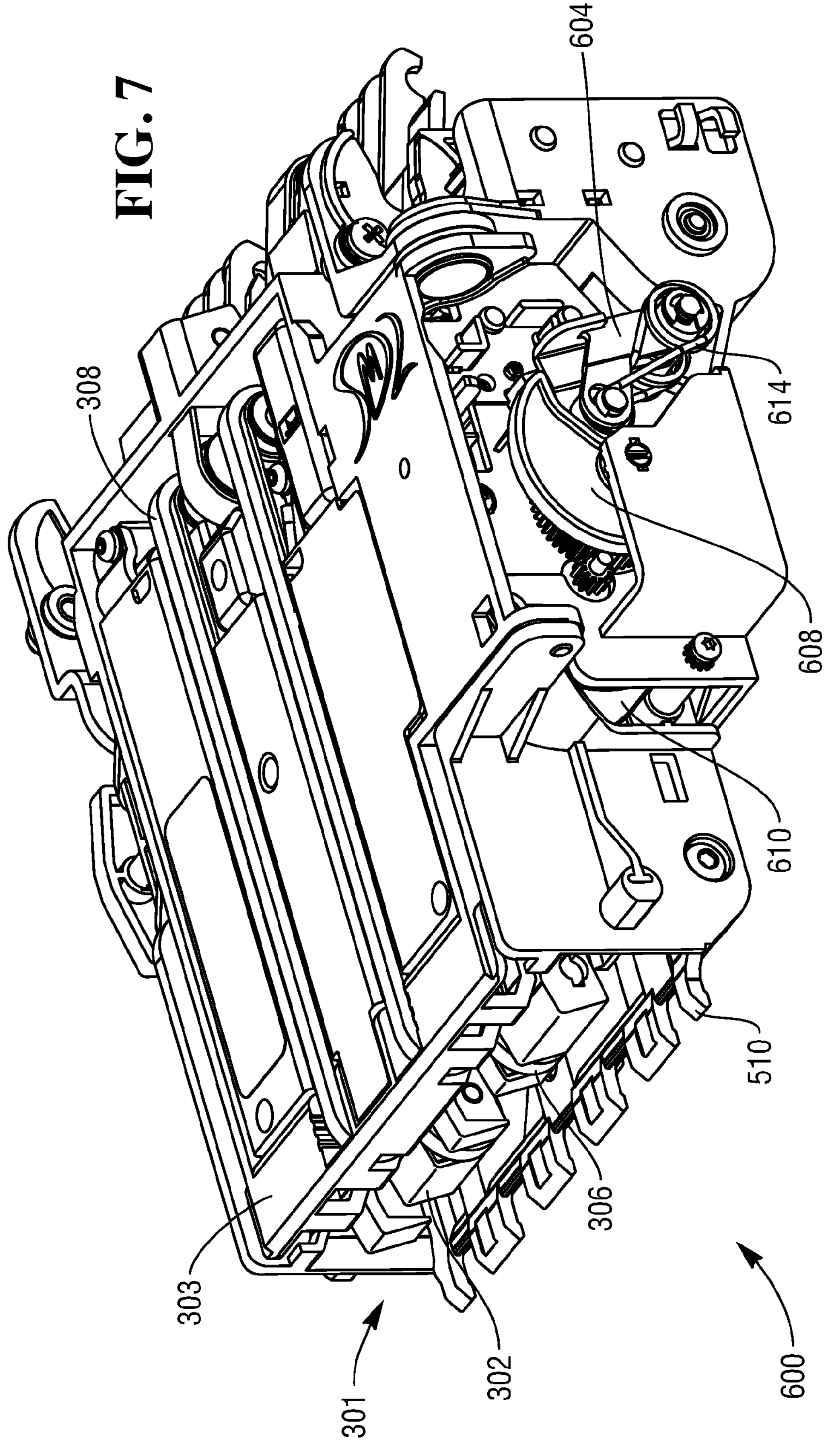
FIG. 7 illustrates the infeed portion and actuator mechanism of the transport mechanism of FIG. 6 when in the closed configuration.

The cam member 608 is shown in the closed position in FIG. 7 and is shown in the open position in FIG. 6. In the guide open and guide closed positions, the lever arm 604 applies a force on the cam member 608 which is directed substantially towards the cam axis C wherein a direction of the force passes through the cam axis C. This allows the lower transport member 302 to remain in the open or closed position with respect to the upper transport member 303 without the stepper motor 610 being energized and applying a drive force to the cam member 608 and in turn the lever arm 604 to otherwise hold the lower transport member 302 in the open or closed position. The end positions 910, 912 of the cam member 608 are approximately 5 degrees in length to allow for wear/tolerances of certain components of the transport mechanism 300 such as the motor 610, transfer gears 612, lever arm 604, or the like.

The bearing member 606 mounted to the lever arm 604 is urged towards the cam member 608 by a spring 614 so that when the lower transport member 302 is in the fully open position, and the lever arm 604 is displaced by a maximum amount by the cam member 604, the spring 614 transfers any forces which may otherwise compromise the integrity of other components of the transport mechanism, such as the lever arm 604.

Figure 8:
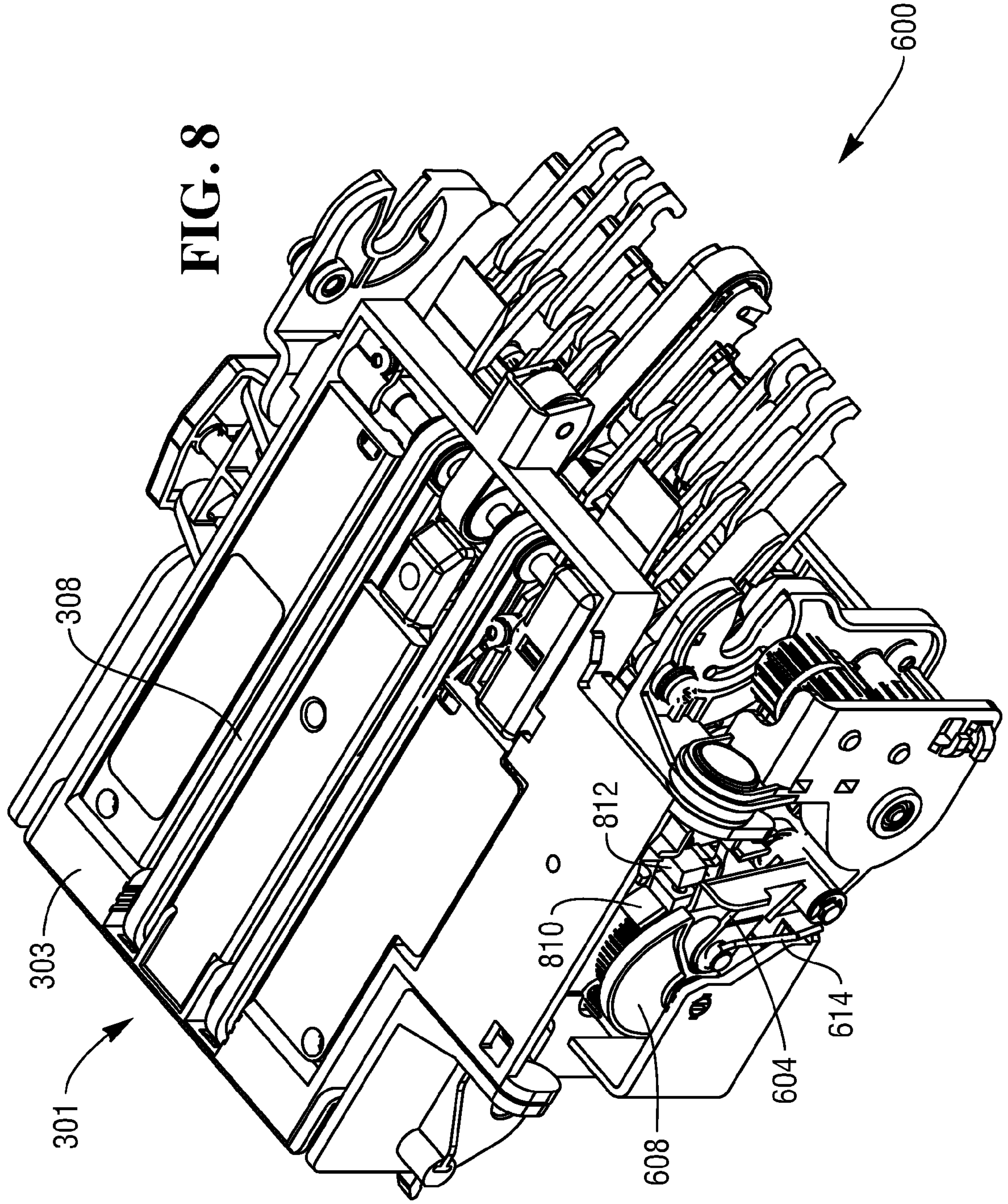
FIG. 8 illustrates further detail of the actuator mechanism of the media item transport mechanism of FIGS. 6 and 7.

As shown in FIG. 8, the cam member 608 carries a cam flag 810 which moves with the lever arm 604 and blocks an optical sensor 812 when the lower transport member 302 is in the fully open position. This allows a controller of the media item processing module 200 to determine when the lower transport member 302 is in the fully open or fully closed position with respect to the upper transport member 303. A graduated disc coupled to the cam member 608 or a shaft encoder may be used to determine a position of the lower transport member 302 relative to the upper transport member 303 to thereby determine a thickness of a bunch of media items located in the transport mechanism. The determined thickness can then be sent by the controller to a media item feeder/separator module, or other module of the media item processing module, located downstream of the transport mechanism so that the feeder/separator module is prepared for receiving the bunch in terms of its thickness.

As shown in FIG. 5, an accelerometer 530 is mounted to at least one 512 of the linkage arms 512, 514 to allow the controller of the media item processing module 200 to determine a vertical position of the lower transport member 302 with respect to the fully closed position. The vertical position of the lower transport member 302 is determined by a thickness of a bunch of media items located between the upper and lower transport members 302, 303. Via the accelerometer 530, the controller determines an angle of each linkage arm to in turn determine a vertical position of the lower transport member 302 with respect to the upper transport member 303. The vertical position can then be used to determine the thickness of a bunch of media items. The cam flag/optical sensor 810, 812 arrangement may be used to calibrate the accelerometer 530.

The media item transport mechanism according to certain embodiments of the present invention allows for a relatively thick bunch of media items to be received in the transport mechanism and transported along a transport path in comparison to known transport mechanisms. The transport mechanism according to certain embodiments of the present invention is compact and less complex than known transport mechanisms and has fewer components which in turn reduces the required maintenance and associated downtime of a media item processing module in which the transport mechanism is located. The transport mechanism according to certain embodiments of the present invention allows the lower transport member to remain in the open and closed positions without any electrical control keeping it open. The transport mechanism also allows for controlled movement of the lower transport member with respect to the upper transport members. It also provides an indication of the position of the lower transport member with respect to the upper transport member and an indication of when the transport mechanism is in the fully open or fully closed configuration.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. Apparatus for transporting a bunch of media items, comprising:

a first transport member and a further transport member located opposite the first transport member to transport a bunch of media items located between said transport members along a transport path;

a drive mechanism to move a one of the first and further transport members towards or away from a remainder one of the first and further transport members to selectively locate the first and further transport members in a selectable spaced apart relationship, wherein the drive mechanism includes at least two linkage arms, each arm having a respective first and further end pivotably connected to a respective transport member or a housing for said respective transport member, and at least one drive shaft coupled to an end of at least one linkage arm to selectively move the one transport member with respect to the remainder one transport member; and at least one sensor to determine a position of the one transport member with respect to the remainder one transport member.

2. The apparatus as claimed in claim 1, wherein the drive mechanism further comprises:

a stepper motor that drives a cam member to selectively rotate the cam member about a cam axis to a desired rotatory position; and a lever arm that drives the at least one drive shaft and that selectively moves responsive to rotation of the cam member.

3. The apparatus as claimed in claim 2, wherein said cam member comprises a running surface having two end positions corresponding to a space between the first and further transport members being a minimum and maximum respectively;

wherein in each of the two end positions, a lever force applied on the cam member by said lever arm is directed towards the cam axis.

4. The apparatus as claimed in claim 3, wherein the cam member is urged against a biasing member that moves with the lever arm.

5. The apparatus as claimed in claim 4, wherein the biasing member comprises a bearing that is spring loaded via a spring that deflects when the first and further transport members are a predetermined distance apart.

6. The apparatus as claimed in claim 1, wherein said at least one sensor comprises at least one accelerometer on a respective one of the linkage arms to determine a vertical position of the one transport member with respect to the remainder one transport member.

7. The apparatus as claimed in claim 2, wherein said at least one sensor comprises an optical sensor that determines a location of a flag member carried on the cam member to indicate when the one transport member is in a predetermined position with respect to the remainder one transport member.

8. The apparatus as claimed in claim 1, wherein said at least two linkage arms remain in a common orientation as said drive shaft rotates.

9. A media item processing module comprising the apparatus as claimed in claim 1.

10. A method of transporting a bunch of media items, comprising the steps of:

locating a bunch of media items between first and further spaced apart transport members;

adjusting a space between the first and further transport members response to a thickness of said bunch of media items by moving a one of the transport members towards or away from a remainder one of the transport members, including pivoting linkage arms that support a one of the first and further transport members with respect to a respective housing;

determining a position of the one transport member with respect to the remainder one transport member; and transporting the bunch of media items along a transport path.

11. The method as claimed in claim 10, wherein the adjusting step further comprises:

via a stepper motor, driving a cam member comprising a running surface having two end positions; and pivoting the linkage arms via a lever arm that moves responsive to rotation of the cam member by the stepper motor.

12. The method as claimed in claim 11, further comprising the step of:

determining a vertical position of the one transport member with respect to the remainder one transport member.

13. The method as claimed in claim 11, further comprising the step of:

indicating when the one transport member is in a predetermined position with respect to the remainder one transport member by determining a location of a flag member on the cam member.

14. A method of providing a desired separation between spaced apart transport members for transporting a bunch of media items, comprising the steps of:

translating a one of a first transport member and a further transport member with respect to a remainder one of the first and further transport members responsive to a thickness of a bunch of media items located between the first and further transport members including pivoting linkage arms that support a one of the first and further transport members with respect to a respective housing.

15. A method of transporting a bunch of media items, comprising:

locating a bunch of media items between first and second spaced apart transport members;

adjusting a space between the first and second transport members response to a thickness of said bunch of media items including energizing a motor;

rotating a drive cam by the motor to engage and rotate a lever arm of the second transport member, thereby moving the second transport member towards or away from the first transport member;

determining that the second transport member has reached a final position based upon the thickness of said bunch of media items; and de-energizing the motor, wherein engagement of the drive cam with the lever arm retains the second transport member in the final position; and transporting the bunch of media items along a transport path.

* * * * *